United States Patent [19]

Ito et al.

[11] Patent Number: 4,941,096
[45] Date of Patent: Jul. 10, 1990

[54] ELECTRONICALLY CONTROLLED AUTOMATIC TRANSMISSION

[75] Inventors: Yasunobu Ito; Kenji Suzuki, both of Anjo, Japan

[73] Assignee: Aisin-Warner Kabushiki Kaisha, Anjo, Japan

[21] Appl. No.: 130,776

[22] Filed: Dec. 9, 1987

[30] Foreign Application Priority Data

Dec. 10, 1986 [JP] Japan .................. 61-294415

[51] Int. Cl.⁵ .................. B60K 41/18; G05D 17/02
[52] U.S. Cl. .................. 364/424.1; 364/424.05; 74/855
[58] Field of Search .................. 364/424.1; 74/866, 843, 74/862, 855; 73/118.1

[56] References Cited

U.S. PATENT DOCUMENTS

| 4,425,620 | 1/1984 | Batcheller et al. .................. 364/424.1 |
| 4,576,065 | 3/1986 | Speranza et al. .................. 74/866 |
| 4,649,775 | 3/1987 | Ootani .................. 74/866 |
| 4,658,676 | 4/1987 | Furusawa et al. .................. 364/424.1 |
| 4,736,655 | 4/1988 | Kumura et al. .................. 74/866 |
| 4,870,581 | 9/1989 | Ito et al. .................. 364/424.1 |

Primary Examiner—Felix D. Gruber
Attorney, Agent, or Firm—Varndell Legal Group

[57] ABSTRACT

If a driver wishes to start off an automotive vehicle in second or third gear when the vehicle is at rest on a road surface having a low coefficient of friction, as is the case when a road surface is covered with snow, the driver operates a winter mode selection switch while the transmission is in the speed range in which the vehicle ordinarily travels, i.e. the D range. After the vehicle has started off in the higher gear following use of the switch, the transmission switches over to the ordinary travel mode automatically as vehicle velocity rises. In a case where the engine is turned off and then restarted, the transmission switches over to the ordinary travel mode automatically. This eliminates any inconvenience that might be caused by forgetting to operate the switch prior to the restarting of the engine.

4 Claims, 4 Drawing Sheets

ELECTRONICALLY CONTROLLED AUTOMATIC TRANSMISSION

BACKGROUND OF THE INVENTION

This invention relates to an electronically controlled automatic transmission in which, when a vehicle equipped with the transmission is to be propelled forward from rest on a road surface exhibiting a low coefficient of friction as caused by snow or the like, the mode in which the vehicle is to be started moving forward can be set, and in which the set mode is capable of being cancelled automatically.

When a vehicle having an automatic transmission is at rest on a road surface with a low coefficient of friction and the vehicle is to be propelled forward while in this state, the vehicle may become stuck in place since the transmission is fixed in the first speed range and cannot be shifted to second or third gear, as in the manner of an automatic transmission, to allow forward movement in these other gears. In an attempt to solve this problem in the prior art, a travel pattern selection switch is provided for manipulation by the driver in a certain limited range of the automatic transmission, such as the second speed range. By operating the switch when the transmission is in this speed range, the driver can select a second-gear or third-gear mode in which the vehicle can be started off from rest on the aforementioned slippery road surface.

With this conventional expedient, however, in order to select, say, the second-gear mode by the travel pattern selection switch, first the shift lever must be placed in a range (e.g. the second speed range) other than the range used in ordinary traveling (e.g. the D range), and then the travel pattern selection switch must be switched over by the driver. Such an operation is troublesome for the driver to perform. Furthermore, if the driver wishes to travel in the ordinary traveling mode (e.g. an economy mode) such as in third gear or fourth gear once the vehicle has been started off in second gear by use of the aforementioned switch, the driver must move the shift lever to another range each time and then must switch over the travel pattern selection switch. This is also a troublesome task for the driver to carry out.

SUMMARY OF THE INVENTION

An object of the present invention is to provide an electronically controlled automatic transmission which enables a vehicle to be started off from rest in a higher gear, such as second or third gear, merely by operating a switch in a speed range used in ordinary travel, so that the driver is not compelled to perform a complicated operation.

Another object of the invention is to provide an electronically controlled automatic transmission which makes it possible to switch over to an ordinary traveling mode automatically as vehicle velocity rises after the vehicle has been started off from rest using the aforementioned switch.

According to the present invention, the foregoing objects are attained by providing an electronically controlled automatic transmission for an automotive vehicle, the transmission having an electronic control unit for deciding whether a shift is to be made on the basis of an output signal from a throttle opening sensor and an output signal from a vehicle velocity sensor, and for driving shift solenoids accordingly, the electronic control unit comprising mode setting means for alternately switching between an ordinary travel mode and a high-gear start-off mode in response to a signal from a mode selection switch, decision means for deciding, when the high-gear start-off mode has been set by the mode setting means; whether throttle opening and vehicle velocity are in respective regions indicative of low gear, and output means for outputting ordinary travel signals or high-gear start-off signals to the shift solenoids in accordance with a signal from the decision means.

Thus, in accordance with the invention, when the driver wishes to start off in second or third gear on a road surface having a low coefficient of friction, as is the case when a road surface is covered with snow, the driver need only operate a switch while the transmission is in the speed range in which the vehicle ordinarily travels. Thus, the driver is not required to perform a complicated operation. After the vehicle has started off in the higher gear following use of the switch, the transmission switches over to the ordinary travel mode automatically as vehicle velocity rises. This enhances the driveability of the vehicle.

In a case where the engine is turned off and then restarted, the transmission switches over to the ordinary travel mode automatically (e.g. an economy mode). This eliminates any inconvenience that might be caused by forgetting to operate the switch prior to the restarting of the engine. An example of such an inconvenience would be where the vehicle starts off in second or third gear owing to previous establishment of the winter mode by operation of the switch, despite the fact that the driver now wishes to start off in the ordinary travel mode at restarting of the engine.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
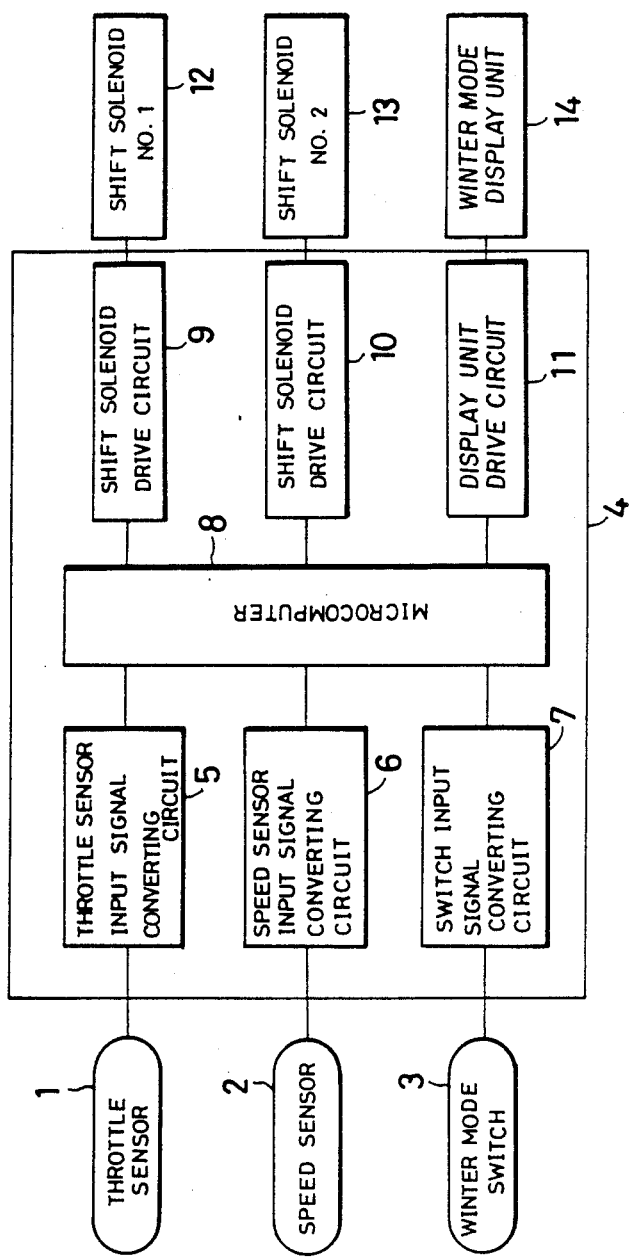
FIG. 1 is a system block diagram illustrating an embodiment of the control system of an automatically controlled automatic transmission according to the present invention.

With reference first to FIG. 1, there is shown a control system which includes a throttle opening sensor 1, a velocity sensor 2, a winter mode switch (high-gear start-off switch) 3 and an electronic control unit 4. The latter comprises a circuit 5 for converting and filtering an input signal from the throttle sensor 1, a circuit 6 for converting and filtering an input signal from the velocity sensor 2, a circuit 7 for converting and filtering an input from the winter mode switch 3, a microcomputer 8, shift solenoid drive circuits 9 and 10, and a display unit drive circuit 11. Outputs from the shift solenoid drive circuits 9, 10 are applied to shift solenoids 12, 13 (shift solenoids Nos. 1 and 2), respectively, and an output from the display unit drive circuit 11 is applied to a winter mode display unit 14 comprising an LED, a lamp or the like.

Though the structure of an automatic transmission to which the invention is applied is not shown, such a transmission would comprise a planetary gear mechanism constituting several speed changing gears, and friction devices for locking or freeing the speed changing gears, as is well-known in the art. The desired gear is obtained by engaging or releasing the friction devices in a manner decided by a combination of on/off states of the shift solenoids 12 and 13.

The electronic control unit 4 selects the proper gear based on a signal indicative of throttle opening, which is sensed by the throttle opening sensor 1, and a signal indicative of vehicle velocity, which is sensed by the velocity sensor 2. The electronic control unit 4 produces output signals indicative of the proper gear and applies these signals to the shift solenoids 12, 13. When the vehicle is to be started off from rest on a road surface, such as a snow-covered road surface, having a low coefficient of friction, the driver operates the winter mode switch 3 to apply an input signal to the electronic control unit 4, which responds by switching over the gear shifting mode to a high-gear start-off mode and outputting second-gear signals or third-gear signals to the shift solenoids 12 and 13.

The processing executed by the microcomputer 8 in the electronic control unit of FIG. 1 will now be described with reference to the flowchart of FIG. 2.

First, initial values are set, the transmission is placed in the ordinary travel mode and the signals indicative of throttle opening and vehicle velocity are read in at steps (1) through (3) of the flowchart. Next, step (4) calls for a determination as to whether the winter mode is presently in effect. As described later with reference to FIG. 4, the program is such that an interrupt is applied if the winter mode switch 3 is in the on state, and it is possible to switch between setting of the winter mode and setting of the ordinary travel mode.

Figure 3:
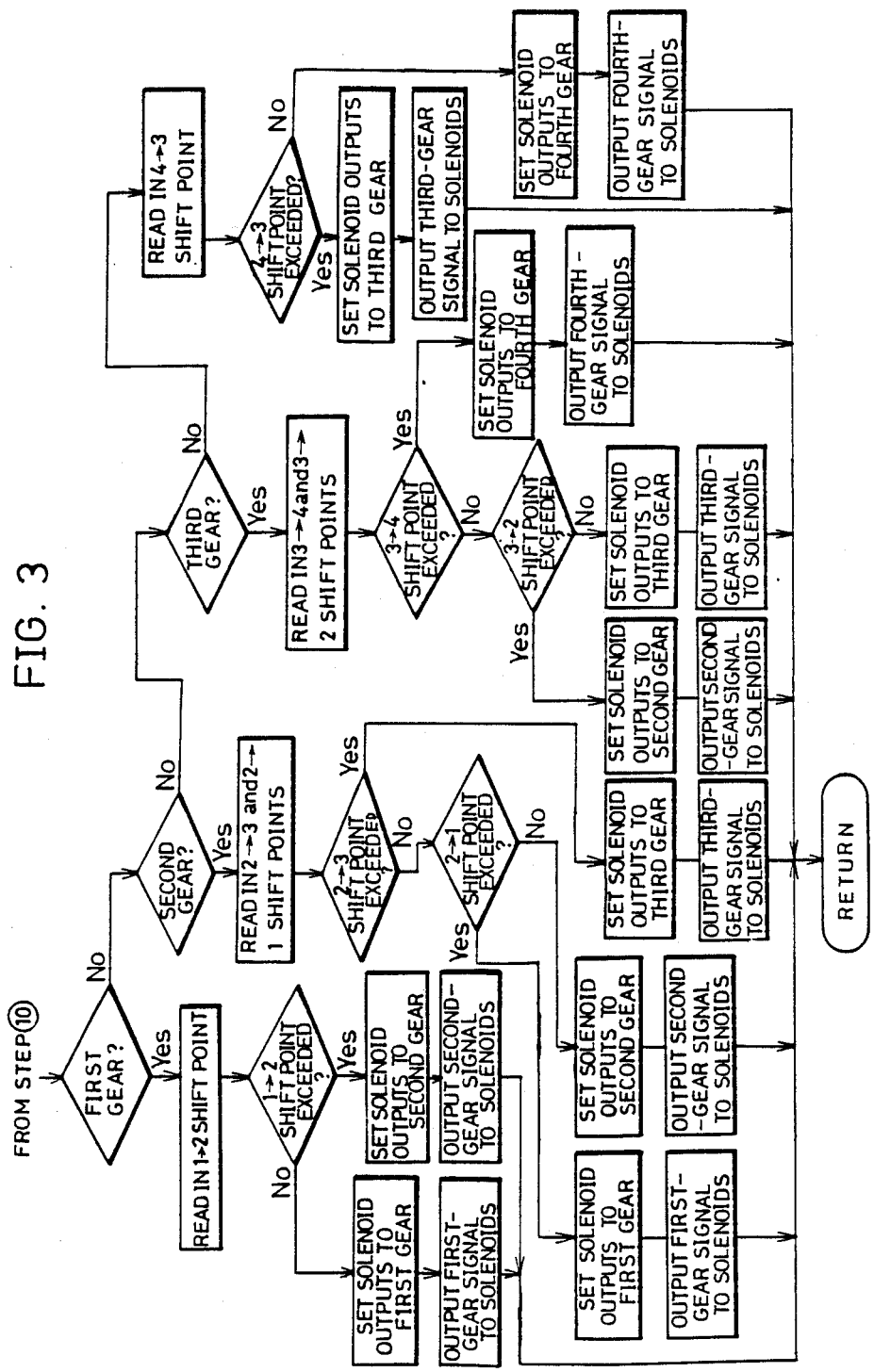
FIG. 3 is a flowchart illustrating the details of processing involved in an ordinary travel mode shift process step of FIG. 2.

If the winter mode is not in effect, the program proceeds from step (4) to step (9), at which the transmission is placed in the ordinary travel mode, followed by step (10), at which the winter display is turned off, and then by step (11), at which gear-shift processing is executed in the ordinary travel mode. If the winter mode is found to be in effect at step (4), on the other hand, the program proceeds to step (5), at which a 1→2 shift point of the ordinary travel mode is read in. Next, in order to determine whether automatic restoration conditions are satisfied, a decision is rendered at step (6) as to whether vehicle velocity is in a region where the shift point is higher than e.g. the 1→2 shift point of the ordinary travel mode. If the answer at step (6) is NO, the winter mode is construed to prevail, the outputs for the solenoids are set to second gear at step (7), and signals indicative of second gear are outputted to the solenoids at step (8). If the vehicle velocity is found to lie in a region where the shift point is higher than the 1→2 shift point, then the program proceeds to step (9), at which the transmission is switched over to the ordinary travel mode, and then to step (10), where the winter mode display is turned off. This is followed by step (11), at which shift processing in the ordinary travel mode is executed, as shown in FIG. 3. In other words, gear-shift decisions are made based on the presently prevailing traveling conditions of the vehicle and the gear-shift pattern in each speed range, and gear-shift signals for first through fourth speeds are outputted to the solenoids based on the results of these decisions.

For example, FIG. 3 shows a speed changing process in ordinary running mode. First of all, a decision is made as to which one of the first, second, third or fourth gears is being used. In accordance with the results of this decision, 1-2 shifting point, 2-3 shifting point, 2-1 shifting point, 3-4 shifting point, 3-2 shifting point or 4-3 shifting point is read in correspondence with the present throttle opening. The thus read shift point in terms of the vehicle velocity is compared with the actual vehicle speed and the speed change gear instruction which is to be delivered to the shift solenoid is set in accordance with the result of the comparison. Thus, FIG. 3 shows a speed changing process which is realized in ordinary electronically controlled automatic transmissions.

An ordinary automatic transmission can be of the type shown, for example in U.S. Ser. No. 07/083,394 of the same inventors as the present invention, filed Aug. 10, 1987, now U.S. Pat. No. 4,870,581. In this transmission, shift solenoids are selectively controlled in accordance with signals delivered to the shift solenoids, so that hydraulic pressure is supplied to hydraulic servo of the transmission to selectively operate frictional engagement means, such as clutch and brake, thereby effecting a shift from one to another gear.

Figure 2:
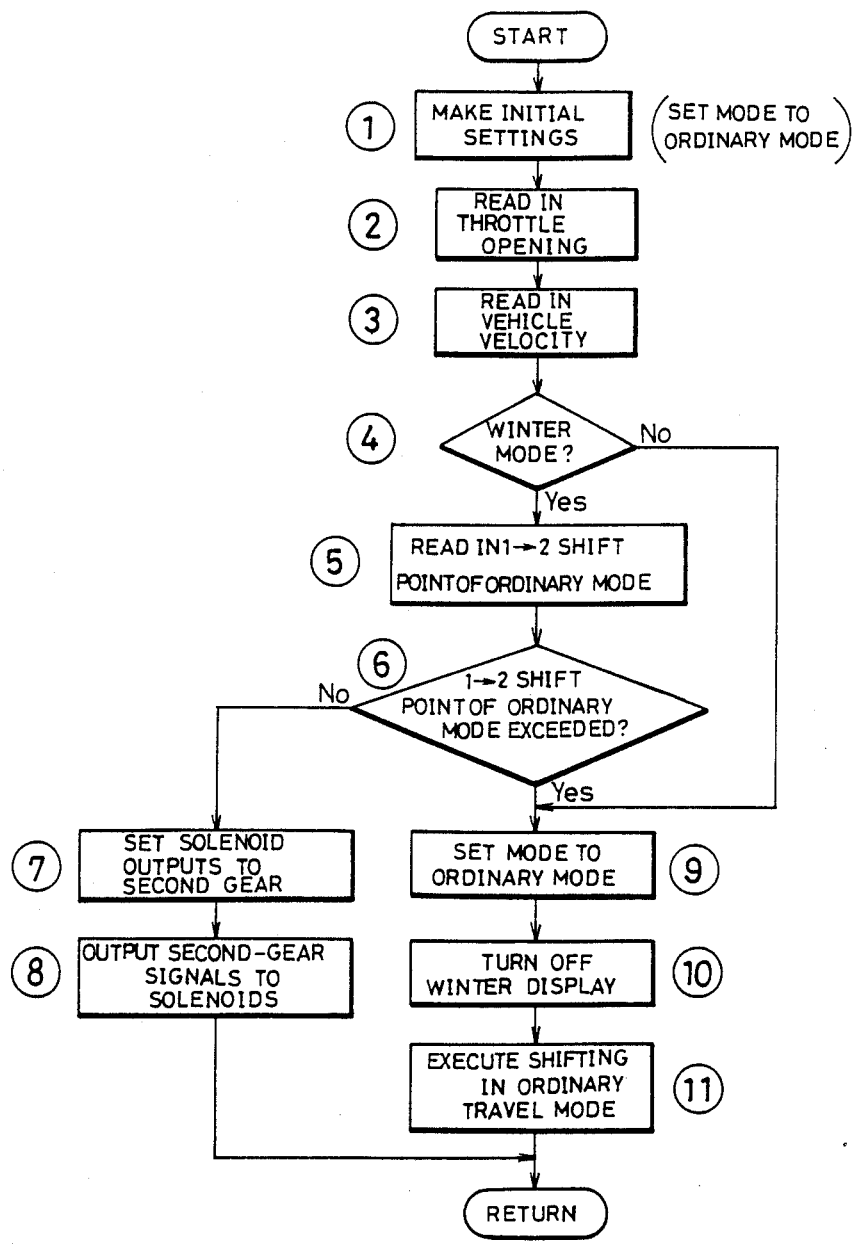
FIG. 2 is a flowchart illustrating processing executed by a microcomputer in the system of FIG. 1.
Figure 4:
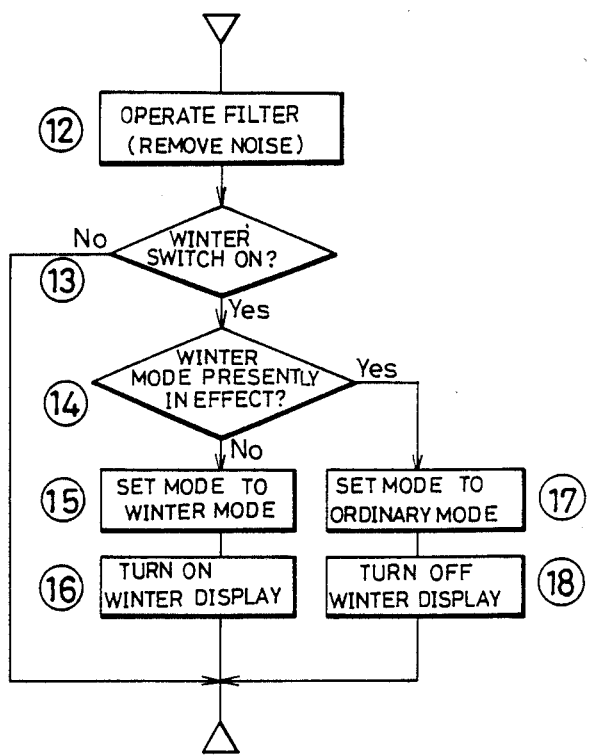
FIG. 4 is a flowchart useful in describing a mode setting operation.

FIG. 4 is a flow chart of the processing in accordance with step (4) of FIG. 2 and is a diagram illustrating the decision process performed in step (4) with respect to winter mode (high gear start-off mode or, simply, high gear start-up).

The initial step (12) of the flow chart shown in FIG. 4 calls for a noise removal by a filter, after which it is determined that step (13) whether the winter mode switch is on.

For winter mode the driver operates mode switch 3 to select the high-gear start-up mode. At step (13) it is determined whether the winter mode switch is ON. At step (14) it is determined whether or not the winter mode is in effect because of the previous selection. If the winter mode is not in effect, the process proceeds to step (15) in which the transmission is set to the winter mode. Then, in step (16) the winter mode indication is turned on.

Conversely, if the winter mode switch is manipulated to select the low-gear start-off mode (ordinary shifting mode or ordinary start-up) while running in the winter mode, i.e., high gear start-up, the process in FIG. 4 proceeds from step (13) to step (14) and then to step (17) in which the transmission is set to the ordinary mode (ordinary start-up). The process then proceeds to step (18) in which the winter mode indication is turned off.

From the above, it is readily apparent that the winter mode switch may be a push-type momentary switch and has a function to allow a manual switching between the winter mode (high gear start-up) and the ordinary mode (ordinary start-up).

If the engine of the vehicle is turned off and then restarted, the transmission is switched over to the ordinary travel mode automatically at the initial setting step (1). This makes it possible to avoid any inconvenience caused by forgetting to operate the winter mode switch 3. An example of such an inconvenience would be where the vehicle starts off in second or third gear owing to previous establishment of the winter mode by operation of the winter mode switch, despite the fact that the driver now wishes to start off in the ordinary travel mode at restarting of the engine.

The invention is not limited to the foregoing embodiment but can be modified in various ways. For example, the case described in the foregoing embodiment is one in which a vehicle at rest on a road surface having a low coefficient of friction starts off in second gear. However, it is possible to adopt an arrangement in which the vehicle starts off in a higher gear, such as third gear. In such case, a 2→3 shift point in the ordinary travel mode would be read in at step (5) of FIG. 2, it would be determined at step (6) whether the vehicle velocity is in a region where the shift point is higher than the 2→3 shift point, the solenoid outputs would be set to the third gear at step (7), and third-gear signals would be outputted to the solenoids at step (8).

In accordance with the present invention as described above, when it is desired to propel a vehicle forward from rest in a higher gear such as second or third gear in order to prevent slipping on a road surface having a low coefficient of friction, this can be accomplished merely by operating a switch while the transmission is in the speed range in which the vehicle ordinarily travels. Thus, the driver is not required to perform a complicated operation. After the vehicle has started off in the higher gear following use of the switch, the transmission switches over to the ordinary travel mode automatically [steps (6), (9) and (10) of the flowchart of FIG. 2] as vehicle velocity rises. This enhances the driveability of the vehicle.

In a case where the engine is turned off and then restarted, the transmission switches over to the ordinary travel mode automatically (e.g. an economy mode) [step (1) of the flowchart of FIG. 2]. This eliminates any inconvenience that might be caused by forgetting to operate the switch prior to the restarting of the engine. An example of such an inconvenience would be where the vehicle starts off in second or third gear owing to previous establishment of the winter mode by operation of the switch, despite the fact that the driver now wishes to start off in the ordinary travel mode at restarting of the engine.

As many apparently widely different embodiments of the invention can be made without departing from the spirit and scope thereof, it is to be understood that the invention is not limited to the specific embodiments thereof except as defined in the appended claims.

What we claim is:

1. An electrically controlled automatic transmission for an automotive vehicle having shift solenoids for controlling gear selection of said transmission, comprising:
   an electronic control unit for detecting ordinary start-up and high gear start-up of said vehicle, for driving said solenoids to engage a low gear for initial movement of said vehicle when ordinary start-up is detected, and for driving said solenoids to engage a higher gear than said low gear for initial movement of said vehicle when said high gear start-up is detected;
   start-up setting means for manually switching between said ordinary start-up and said high gear start-up;
   said electronic control unit including decision means for determining whether the instant state of vehicle velocity is within an acceptable region for said low gear, when said start-up setting means has been switched to said high gear start-up;
   high gear start-up output means for driving said shift solenoids to engage said higher gear, when said instant state of vehicle velocity is within said acceptable region for said low gear; and
   high gear start-up dismissal means for switching to said ordinary start-up, when said instant state of vehicle velocity is outside of said acceptable region for said low gear.

2. The automatic transmission according to claim 1, wherein said start-up setting means includes display means for displaying high gear start-up is in effect.

3. An electrically controlled automatic transmission for an automotive vehicle having shift solenoids for controlling gear selection of said transmission, comprising:
   an electronic control unit for driving said shift solenoids in an ordinary shifting mode by responding to signals from a throttle opening sensor and vehicle velocity sensor including engaging a low gear for initial movement of said vehicle;
   switch means for manually engaging one of said ordinary shifting mode and a high gear start-up;
   said electronic control unit having decision means for determining whether an instant state of vehicle velocity is within an acceptable region for said low gear, when said high gear start-up has been engaged;
   high gear start-up output means driving said solenoids to engage a higher gear than said low gear for initial movement of said vehicle, when said high gear start-up has been engaged and said instant state of vehicle velocity is within said acceptable region for said low gear; and
   high gear start-up dismissal means for switching from said high gear start-up to said ordinary shifting mode, when said high gear start-up has been engaged and said instant state of vehicle velocity is outside of said acceptable region for said low gear.

4. The automatic transmission according to claim 3, wherein said electronic unit includes means for driving a display means for displaying high gear start-up when engaged.

* * * * *